3,147,127
PRODUCTION OF GLASS REINFORCED
CEMENTITIOUS ARTICLES
Richard F. Shannon, Lancaster, Ohio, assignor to Owens-Corning Fiberglas Corporation, a corporation of Delaware
No Drawing. Filed Dec. 13, 1961, Ser. No. 159,146
11 Claims. (Cl. 106—99)

This invention relates to the production of reinforced articles, and, more particularly, to the production of such articles comprising flakes or fibers of glass or a similar material and an inorganic binder.

It has heretofore been suggested that various inorganic binders be employed in the production of articles reinforced with fibers or flakes of glass or other similar material. Many of such binders, however, contain a sufficiently high proportion of highly alkaline cations that they attack glass in the form of flakes or fibers and rapidly destroy the efficacy thereof as reinforcements. Attack and destruction of the glass reinforcing properties is particularly rapid and noticeable under humid conditions. As specific examples, alkali gypsum and Portland cements are so highly alkaline that they will actually dissolve glass flakes or glass fibers used in conjunction therewith as reinforcing constituents. After a few months, an article comprising such an inorganic binder reinforced with glass fibers or flakes will be found to be composed essentially of the binder, without any reinforcement. While a large portion of the attack and destruction occurs because of the highly alkaline nature of such inorganic binders, the alkali attack invariably involves a leaching of highly alkaline constituents from the glass, and promotion and acceleration of the attack by the leached constituents.

As a result of the phenomena discussed in the preceeding paragraph there remains a substantial need that might otherwise have been filled by an inorganic binder. That need is for a binder which can be reinforced with glass fibers or flakes, and that is capable of resisting temperatures beyond the range of organic binders which have been used satisfactorily with such reinforcement. The available inorganic binders that have the necessary temperature resistance cannot be used because of their attack on the glass.

The present invention is based upon the discovery that various inorganic binders of alkali gypsum and Portland cement can be reconstituted, by chemical reaction of harmful alkaline constituents with a cation exchange material, to a form in which they do not attack glass or similar materials in the form of flakes or fibers, and that articles having properties such as high temperature resistance not heretofore available in glass reinforced materials can be produced from such reconstituted inorganic binders and glass flake or fiber reinforcement. Articles containing glass reinforcements can range from relatively dense impervious masses to porous masses of hardened reconstituted inorganic binder. The glass reinforcement therein can be numerous individual fibers, flakes and the like, and/or groups of such individual glass bodies. The glass reinforcement can be a glass fabric or an integral wool-like mass of glass fibers or the like intermeshed with one another, and, if desired, bonded at points of contact, usually with a hardened phenolic binder. Generally glass reinforcements are used in manners known heretofore for those previously known satisfactory binders, usually of an organic resinous nature. In general the utility of the articles is similar to that of heretofore known glass reinforced organic resinous masses, but greater because of their temperature resistance. They are particularly useful in numerous and varied sound and thermal insulating applications.

It is, therefore, an object of the invention to provide an improved composition of matter comprising a chemically reconstituted inorganic binder and, as a reinforcing medium, flakes or fibers of glass or other similar material.

It is a further object of the invention to provide an improved composition of matter comprising an inorganic binder containing a cation exchange material and, as a reinforcing medium, flakes or fibers of glass or other similar material.

It is another object of the invention to provide an improved method for producing articles reinforced with glass or other similar material, using an inorganic binder containing a cation exchange material.

It is a further object of the invention to provide a reinforced article consisting essentially of glass fiber reinforcement and an organic binder of an alkali gypsum cement containing a cation exchange material.

It is an additional object of the invention to provide a reinforced article consisting essentially of glass fiber reinforcement and an inorganic binder of Portland cement containing a cation exchange material.

Other objects and advantages will be apparent from the description which follows, which is intended only to illustrate and disclose, but in no way to limit, the invention.

According to the invention a composition and an article are provided. The composition and article comprise a mass of glass or similar reinforcement, in a physical form having a high ratio of surface to weight and at least one dimension which is small by comparison with at least one other dimension, i.e., in the form of flakes or fibers, and an alkali gypsum or Portland cement inorganic binder containing a cation exchange material. The composition and article are produced by a method which includes the steps of: mixing a glass reinforcement with a mixture of a cation exchange material and an alkali gypsum or Portland cement binder, and hardening the cement. The binder contains at least one alkali compound whose cations are capable of forming a carbonate, hydroxide, or silicate having a pH greater than 10.5 in aqueous solution. These cations include lithium, sodium, potassium, rubidium, cesium, and calcium. The cation exchange material is one which is reactive with the alkali compound to produce an inorganic binder constituent and a second compound which is a salt form of the exchanger, both of which have a pH not greater than 10.5 in aqueous solution. It is preferred that the cation exchange material, which reacts with the alkali metal compound, be in an amount at least sufficient for substantially complete reaction with the alkali metal compound.

Portland cement and alkali gypsum are inorganic binders which include at least one alkali compound having cations capable of forming a carbonate, hydroxide, or silicate having a pH greater than 10.5. Generally, compounds such as the oxides of calcium, sodium and potassium are present therein in more than trace amounts and, in the presence of moisture, cause rapid degradation of glass reinforcements. These unreconstituted binder materials, therefore, are unsuited for use in conjunction with glass flake or fiber reinforcements. This problem cannot be solved by neutralization, e.g., with sulfuric acid, because sodium sulfate, for example, is substantially as harmful as sodium hydroxide. The cations themselves, in an ionizable form, are capable of causing the degradation. In the process of the invention these binder materials are reconstituted so that the harmful alkali compounds therein are reacted with a cation exchange material to produce resulting constituents which have a pH not greater than 10.5 in aqueous solution, and constituents from which the cations are not significantly ionizable. Thus, in the reconstituted inorganic binders of the invention the harmful alkali cations of Li, Na, K, Rb, Cs and Ca have been tied up as the salt form of the cation exchanger constituent to an extent sufficient to reduce the alkalinity to a pH of less than about 10.5, a pH which does not cause degradation of the glass reinforcement. These cations are not ionizable, when present as the salt form of the exchanger, to an extent sufficient to cause degradation. When a cation exchange material in the hydrogen or acid cycle is used, the hydrogen ion of the cation exchanger replaces the cation of the alkali metal compound in the binder, and the cation replaces the hydrogen ion, thereby converting the cation exchange material to the salt form. When the cation exchange material is used in the ammonium salt cycle the ammonium cation of the salt form of the exchanger interchanges with the cation of the alkali compound. In all instances both the salt form of the exchange material and the inorganic binder constituent resulting from the reaction of the alkali metal compound and the exchange material must have a pH not greater than 10.5 in aqueous solution, and the harmful cations are not significantly ionizable.

As is indicated above, it is preferred that the amount of cation exchange material employed be at least sufficient for substantially complete reaction with the alkali metal compound included in the inorganic binder; for optimum results an excess of cation exchange material should be employed. It is known that alkali metal oxides tend to leach from glass flakes and fibers during ordinary aging thereof, and that the leached oxides deteriorate the glass from which they were leached. By using an excess of the cation exchange material it is possible to provide in the binder composition what might be denominated a "buffer" or "scavenger," which is available to counteract the harmful effect of such leached alkali.

Various cation exchange materials, natural and synthetic, inorganic and organic, are employed for reaction with the alkali metal compound. The cation exchange material can be in either the acid form or the ammonium salt form. In the acid form, the cations of the alkaline constituent of the cement binder are replaced by the hydrogen ions of the ion exchange material while the cations combine with the ion exchange material to convert it to a salt cycle. In the ammonium salt form, the cations of the exchange material are replaced by cations of the alkaline constituent of the cement binder and vice versa. As examples of naturally occurring cation exchange materials that can be employed, mention can be made of the zeolites and of sulfonated coals. Particularly useful are zeolitic aluminum silicate clays. When reconstituted binders for use at relatively low temperatures are desired, best results can usually be obtained with the relatively more efficient, or higher capacity, synthetic cation exchange resins which have been developed, for example of the type of sulfonated polymerized mixtures of a polyvinyl aryl compound and a monovinyl aryl compound, suggested in U.S. Patent 2,366,007. Inorganic binders, however, are usually of particular advantage where they are intended for the production of materials resistant to relatively high temperatures. The synthetic organic cation exchange materials undergo pyrolysis at temperatures substantially below the limits of many inorganic binders. Particularly the zeolite type of cation exchange material retains its effectiveness at temperatures substantially above the pyrolysis temperatures of most organic ion exchangers. As is usually the case, it is desirable that the ion exchange material not only reconstitute the inorganic binder, but also that it be present in an amount to act as a buffer and counteract the effect of alkali leached from the glass during aging. The zeolites are preferred cation exchange materials, if a high temperature product is desired.

The amount of cation exchange material employed should be at least sufficient for substantially complete reaction with all of the alkali compound containing cations that form hydroxides, carbonates or silicates having a pH higher than 10.5 in aqueous solution, and most desirably an excess of the exchange material is used. The amount of any given cation exchange material required for substantially complete reaction with such an alkali compound in a particular binder composition can be determined experimentally, for example, by means of a pH titration of the exchange material with the binder composition. As a specific example of such a pH titration, a known weight of a cation exchange material in the ammonium salt or hydrogen form can be placed in a beaker or flask with several volumes of boiled distilled water per volume of the exchange material, and successive small additions of an aqueous slurry of the binder composition made while stirring vigorously. pH readings are taken initially and after each addition. In the case of the titration of the hydrogen form of the exchange material available under the designation "Amberlite IR-120" (a sulfonated polymerized mixture of a polyvinyl aryl compound and a monovinyl aryl compound) with a high alkali Portland cement, a plot of pH versus cc. of aqueous cement slurry added will have generally the shape of the titration curve of a strong acid with a strong base. From the known amount of the cation exchange material initially weighed into the beaker or flask and the total amount of the added binder composition required to exhaust the cation exchanging capacity of this known amount of exchange material, i.e., to take the pH above 7 and on the alkaline side, a weight equivalent of the particular ion exchange material to a particular binder composition is realized. Multiplication of the amount of binder composition to be employed by this weight equivalent determines the minimum amount of cation exchanger which should be employed. As is stated above, at least this amount of the cation exchange material should be employed, and, preferably, an excess thereof is used. For optimum results, the amount of the cation exchange material employed to reconstitute an inorganic binder in accordance with the invention should be from 1.1 to 1.7 times the amount thereof required for substantially complete reaction with the harmful alkali compound constituents in the binder composition.

In the examples, which follow, and in the appended claims, the terms "parts" and "percent" refer to parts and percent by weight.

*Example 1*

The following composition was prepared:

|  | Parts |
|---|---|
| Dry Portland cement [1] (a general use Portland cement, Type I, ASTM Spec. C-150-53) | 100 |
| Acid-treated albino clay (the albino clay was an aluminum silicate kaolin-type clay, of a whitish color and minus 325 mesh (U.S. Sieve series), which had been stirred for about two hours with an aqueous about 10 percent HCl solution, then removed, washed with distilled water, and dried. The absorption capacity of this acid-treated albino clay was about 0.8 milliequivalent of sodium per gram thereof) | 10 |
| Water sufficient to make a thin slurry ____About | 30 |

[1] The cement contained at least one alkali compound having Li, K, Na, Rb, Cs or Ca cations.

The Portland cement and acid-treated albino clay were mixed together dry, and then about 30 parts of water admixed therewith. To the resulting admixture were added 40 parts of chopped spun roving glass fibers to give a workable slurry. The chopped glass fibers were about one inch lengths, had a nominal diameter of 0.000036 inch, and had thereon a methacrylato chromic chloride size of the type described with particularity in U.S. Patent No. 2,611,718. The chopped glass fibers were mixed manually in the slurry until uniformly distributed, whereupon portions of the resulting composition were placed in molds to form bars about 2" x ½" x 24". The bars were left under ambient conditions in the molds for about one day, to set and dry, after which they were removed and allowed to age for about one month. At this time they were subjected to low pressure steam of about 180 p.s.i. for about 8 hours, and then air dried for several days. The average density of the bars was 92.0 p.c.f. (pounds per cubic foot).

For comparison purposes bars about 2" x ½" x 24" were prepared in a like manner except that the acid-treated albino clay and the chopped glass fibers were omitted. The average density of these bars was 92.8 p.c.f.

*Example 2*

Additional bars about 2" x ½" x 24" were prepared in the same manner as in Example 1 of an almost identical composition except that the 10 parts of acid-treated albino clay were replaced by 10 parts of a zeolite ion exchange material in the hydrogen or acid form. The zeolite ion exchange material was a commercially available permutite consisting essentially of artificial sodium aluminum silicate (zeolite), obtained by melting aluminum silicate, sodium carbonate and sand together. This commercial zeolite, prior to employment in the composition, was comminuted to a particle size of minus 325 mesh (U.S. Sieve series), soaked with mixing for 2 hours in an aqueous HCl solution (about 10 percent), washed with distilled water, and dried. This acid regenerated zeolite had an absorption capacity of about 1 to 3 milliequivalents per gram thereof. The average density of the bars which were produced was 97.0 p.c.f.

*Example 3*

The following composition was prepared:

|   | Parts |
|---|---|
| Alkali gypsum cement (Hydrocal B–11, sold by the U.S. Gypsum Company) | 100 |
| Acid-treated albino clay (identical with the acid-treated albino clay employed in Example 1) | 10 |
| Water | About 48 |

The alkali gypsum cement and acid-treated albino clay were mixed together dry and then sufficient water, about 48 parts, admixed therewith to give a smooth workable slurry. Glass fibers (48 parts) identical with those employed in Example 1 were then added to the slurry. The glass fibers were manually mixed in the slurry and bars about 2" x ½" x 24" were prepared in molds in the manner described in Example 1. The average density of these bars was 85.8 p.c.f.

For comparison purposes bars about 2" x ½" x 24" were prepared in a like manner except that the acid-treated albino clay and the glass fibers were omitted. The average density of these bars was 87.1 p.c.f.

*Example 4*

Additional bars about 2" x ½" x 24" were prepared in the same manner as in Example 3 with an almost identical composition except that the albino clay was replaced by 10 parts of a synthetic, strongly acidic, cation exchange resin in the hydrogen or acid form. The cation exchange resin was a nuclear sulfonic acid type from nuclear sulfonation of a polymerized mixture of 92 percent styrene monomer and 8 percent divinylbenzene and was in the form of small spherical beads of about −20 to +50 mesh size (U.S. Sieve series). The average density of the bars which resulted was 80.3 p.c.f.

Bars, prepared in accordance with each of the preceding examples, remained for about one day in their molds to set and dry, were removed therefrom, permitted to age at ambient conditions for about one month, exposed to low pressure steam of about 180 p.s.i. for 8 hours, and then air dried for several days before measurement of their physical properties. Physical properties of such glass fiber reinforced bars are summarized in the table which follows:

| Example No. | Inorganic Binder | Modulus of Rupture Stress [a] (p.s.i.) at — | |
|---|---|---|---|
| | | Maximum | P.E.L.[b] |
| Comparison | Portland Cement | 805 | 556 |
| 1 | Portland Cement plus Acid-treated Albino Clay | 1,219 | 795 |
| 2 | Portland Cement plus Zeolite | 1,015 | 652 |
| Comparison | Alkali Gypsum Cement | 1,605 | 1,111 |
| 3 | Alkali Gypsum Cement plus Acid-treated Albino Clay | 2,795 | 1,848 |
| 4 | Alkali Gypsum Cement plus Synthetic Cation Exchange Resin | 2,903 | 1,589 |

[a] Determined according to the procedure of ASTM specification C 293–57T.
[b] Proportional elastic limit.

All values reported in the previous table are the averages of at least six test measurements. From this data it is apparent that aged glass fiber reinforced articles according to the invention have significantly greater strength than do like articles containing an inorganic binder that has not been reconstituted. The difference is apparent after aging for slightly longer than one month plus an accelerated aging by low pressure steam exposure. The modulus of rupture of glass reinforced articles made from the reconstituted inorganic binder, in each instance, is substantially improved, as much as 1¾ times in one example.

*Example 5*

Portland cement and a synthetic cation exchange resin are mixed together dry, and water is then mixed therewith to give a thin slurry. The proportions of materials are as follows:

|   | Parts |
|---|---|
| Dry Portland cement (a general use Portland cement, Type I, ASTM Spec. C–150–53) | 100 |
| Synthetic cation exchange resin [1] | 20 |
| Water sufficient to make a thin slurry | About 35 |

[1] The "synthetic cation exchange resin" is the same as that identified in Example 4, above. Prior to being mixed with the cement it is placed in the ammonium salt cycle by regeneration with a 10 percent solution of ammonium sulfate in water until the exchanger does not react with the solution. Such a "synthetic cation exchange resin" in the hydrogen or acid cycle is commercially available, from the Dow Chemical Company, Midland, Michigan, under the trade designation "Dowex 50."

Glass fibers (45 parts), identical with those employed in Example 1, then are added and manually mixed in the slurry. Bars, about 2" x ½" x 24", are prepared in molds from this resulting admixture in the manner described in Example 1.

These bars are permitted to set and dry in their molds for about one day; after which they are removed therefrom and aged under moist conditions at ambient temperatures. After several months of such aging, these bars are found to be stronger than comparison bars prepared and aged in a like manner except that the synthetic cation exchanger is omitted from the binder composition.

It will be apparent that various changes and modifications can be made from the specific details discussed herein about departing from the spirit and scope of the attached claims.

What I claim is:

1. A method for producing an article consisting essentially of a mass of glass reinforcement in a physical form having a high ratio of surface to weight and an inorganic binder for said glass reinforcement, which method includes the steps of: mixing the glass reinforcement with a reconstituted binder consisting essentially of the products of reaction in an aqueous medium between a cation exchange material and a binder containing an alkali compound, the binder being selected from the group consisting of alkali gypsum and Portland cements which contain an alkali compound having cations selected from the group consisting of Li, K, Na, Rb, Cs and Ca, the amount of the cation exchange material being sufficient for substantially complete reaction with the alkali compound, and the cation exchange material being selected from the group consisting of zeolites, sulfonated coals, and synthetic cation exchange resins, and, in each case, in a cycle selected from the group consisting of hydrogen and ammonium, and hardening the reconstituted binder.

2. The method of claim 1 wherein the cation exchange material is in the hydrogen cycle.

3. The method of claim 1 wherein the cation exchange material is in the ammonium salt cycle.

4. The method of claim 1 wherein the binder is an alkali gypsum.

5. The method of claim 1 wherein the binder is Portland cement.

6. The method of claim 1 wherein an excess of the cation exchange material is employed, the amount thereof being from 1.1 to 1.7 times the amount sufficient for substantially complete reaction.

7. A reconstituted inorganic binder suitable for use with glass reinforcement, the reconstituted binder consisting essentially of the products of reaction in an aqueous medium between a mixture of a cation exchange material and a binder containing an alkali compound, the binder being selected from the group consisting of alkali gypsum and Portland cements which contain an alkali compound having cations selected from the group consisting of Li, K, Na, Rb, Cs and Ca, the amount of the cation exchange material being sufficient for substantially complete reaction with the alkali compound and the cation exchange material being selected from the group consisting of zeolites, sulfonated coals, and synthetic cation exchange resins, and, in each case, in a cycle selected from the group consisting of hydrogen and ammonium.

8. An article of manufacture consisting essentially of: a mass of glass reinforcement in a physical form having a high ratio of surface to weight; and, as a binder therefor, a hardened reconstituted binder consisting essentially of the products of reaction in an aqueous medium between a mixture of a cation exchange material and a binder containing an alkali compound, the binder being selected from the group consisting of alkali gypsum and Portland cements which contain an alkali compound having cations selected from the group consisting of Li, K, Na, Rb, Cs and Ca, the amount of the cation exchange material being sufficient for substantially complete reaction with the alkali compound and the cation exchange material being selected from the group consisting of zeolites, sulfonated coals, and synthetic cation exchange resins, and, in each case, in a cycle selected from the group consisting of hydrogen and ammonium.

9. The article of claim 8 wherein the reconstituted binder contains an excess of the ion cation exchange material the amount thereof being from 1.1 to 1.7 times the amount sufficient for substantially complete reaction.

10. The article of claim 8 wherein the glass reinforcement comprises glass fibers and the cation exchange material is in the hydrogen cycle.

11. The article of claim 8 wherein the glass reinforcement comprises glass fibers and the cation exchange material is in the ammonium cycle.

References Cited in the file of this patent
UNITED STATES PATENTS
2,664,406    Armstrong _____ Dec. 29, 1953